United States Patent
Erickson et al.

(10) Patent No.: US 7,055,543 B2
(45) Date of Patent: Jun. 6, 2006

(54) SOLENOID ACTUATED CONTROL FOR FUEL DISTRIBUTION IN A DUAL FUEL TANK VEHICLE

(75) Inventors: Eric D. Erickson, Fort Wayne, IN (US); Sharon L. Klinger, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/974,638

(22) Filed: Oct. 27, 2004

(65) Prior Publication Data
US 2006/0086389 A1  Apr. 27, 2006

(51) Int. Cl.
*B60K 15/06* (2006.01)
*F02M 37/04* (2006.01)

(52) U.S. Cl. .................. 137/255; 137/396; 123/514
(58) Field of Classification Search ............. 137/255, 137/395, 396; 123/514
See application file for complete search history.

(56) References Cited

U.S. PATENT DOCUMENTS

| | | | |
|---|---|---|---|
| 4,930,537 A | 6/1990 | Farmer | |
| 5,163,466 A | 11/1992 | Moody | |
| 5,555,873 A | 9/1996 | Nolen | |
| 5,960,809 A | 10/1999 | Keller | |
| 6,494,226 B1 * | 12/2002 | Tipton et al. | 137/396 |
| 6,799,562 B1 | 10/2004 | Pratt et al. | |

* cited by examiner

*Primary Examiner*—Kevin Lee
(74) *Attorney, Agent, or Firm*—Jeffrey P. Calfa; Dennis Kelly Sullivan; Susan L. Lukasik

(57) ABSTRACT

A vehicle chassis with at least two fuel tanks with an engine engaged to the chassis structural member. Each of the fuel tanks has fuel level detector or sender. The level senders are engaged to an electronic controller. Each of the tanks has fuel draw line from it. The system uses a single control valve to equalize the fuel tank levels by use of a dual draw single return system. The system is split into a primary and secondary tank. The fuel level senders send information to an electronic controller generating a signal to the solenoid or control valve when a specific fuel level difference exists. Activating the solenoid or control valve from closed to open, located in the draw side fuel line from the secondary tank, fuel is drawn from both tanks. The return goes only to the primary tank. When the levels are equalized, the electronic controller sends signal to the control valve to close.

14 Claims, 2 Drawing Sheets

SOLENOID ACTUATED CONTROL FOR FUEL DISTRIBUTION IN A DUAL FUEL TANK VEHICLE

BACKGROUND OF INVENTION

Motor vehicles such as medium or heavy-duty trucks may have dual or multiple fuel tank systems. The traditional approach was for the engine to draw fuel from both of the tanks. One complexity to the system is that some engines such as diesel do not use all of the fuel that is provided to them. These vehicles have a return line, which returns the fuel to one or both of the tanks. When the fuel returns to one tank when there is a dual draw, imbalances result between the levels in the tanks. This is especially true where there is a single draw from one tank and a return to the other. Additionally, the returning fuel is generally heated when expelled from a warm engine. This results in warmed fuel being provided to one tank. Dual draw systems in the past used transfer pumps between the tanks; sets of draw and return valves; or equalization lines. This resulted in a number of parts and still there wasn't an easy way to isolate one tank in the event of a leak. This invention provides a solenoid actuated control for fuel distribution in a dual tank vehicle system.

SUMMARY

This invention involves a vehicle chassis with at least two fuel tanks. There is an engine engaged to a chassis structural member. Each of the fuel tanks has fuel level detector or sender. The level senders are engaged to an electronic controller. Each of the tanks has fuel draw line from it. One of the tanks, a primary tank, has a fuel return line from the engine. The system uses a single control valve to equalize the fuel tank levels by use of a dual draw single return system. The system is split into a primary and secondary tank. The fuel level senders send information to the Electronic System Controller generating a signal to the solenoid or control valve when a specific fuel level difference exists. The control valve has a single inlet and a single outlet. Activating the solenoid or control valve from closed to open, located in the draw side fuel line from the secondary tank, fuel is drawn from both tanks. The return goes only to the primary tank. When the levels are equalized, the electronic controller sends signal to the control valve to close and fuel is drawn and returned to only the primary tank. The control valve may be electronic, solenoid, hydraulic, or air operated so long as it is controlled by an electronic controller that receives fuel level input from both of the tanks. The system allows positive control of fuel equalization without adding duplicate components such as a fuel transfer pump. It also prevents overfilling of the storage tank, the most common issue with dual draw and return methods. The system also prevents continuous pumping by providing positive control of fuel tank balance rather than passive "catch up".

DRAWINGS

Other objects and advantages of the invention will become more apparent upon perusal of the detailed description thereof and upon inspection of the drawings, in which.

DESCRIPTION OF INVENTION

Figure 1:
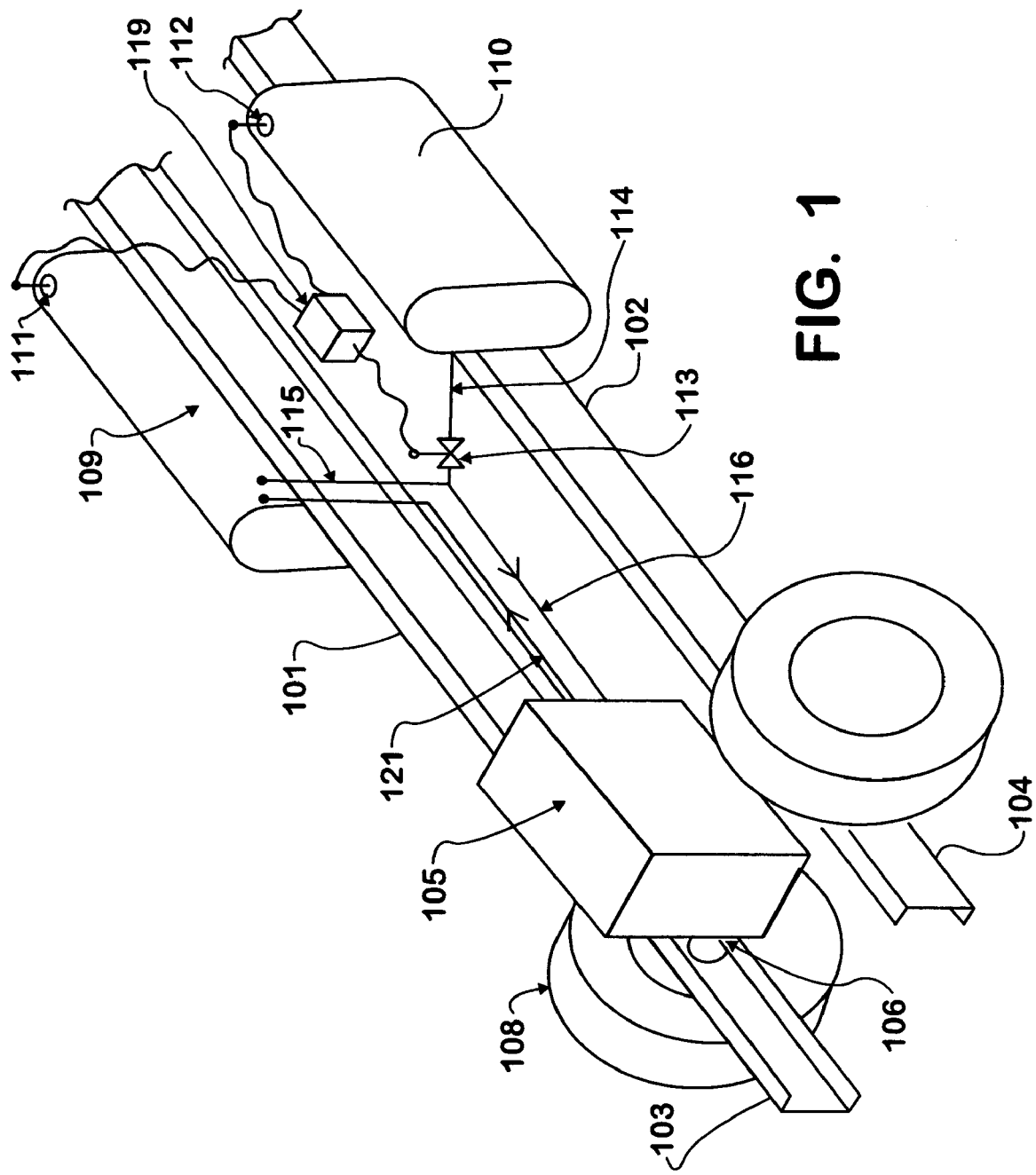
FIG. 1 is a vehicle chassis that uses solenoid actuated control for fuel distribution in a dual tank vehicle system and is made in accordance with this invention.
Figure 2:
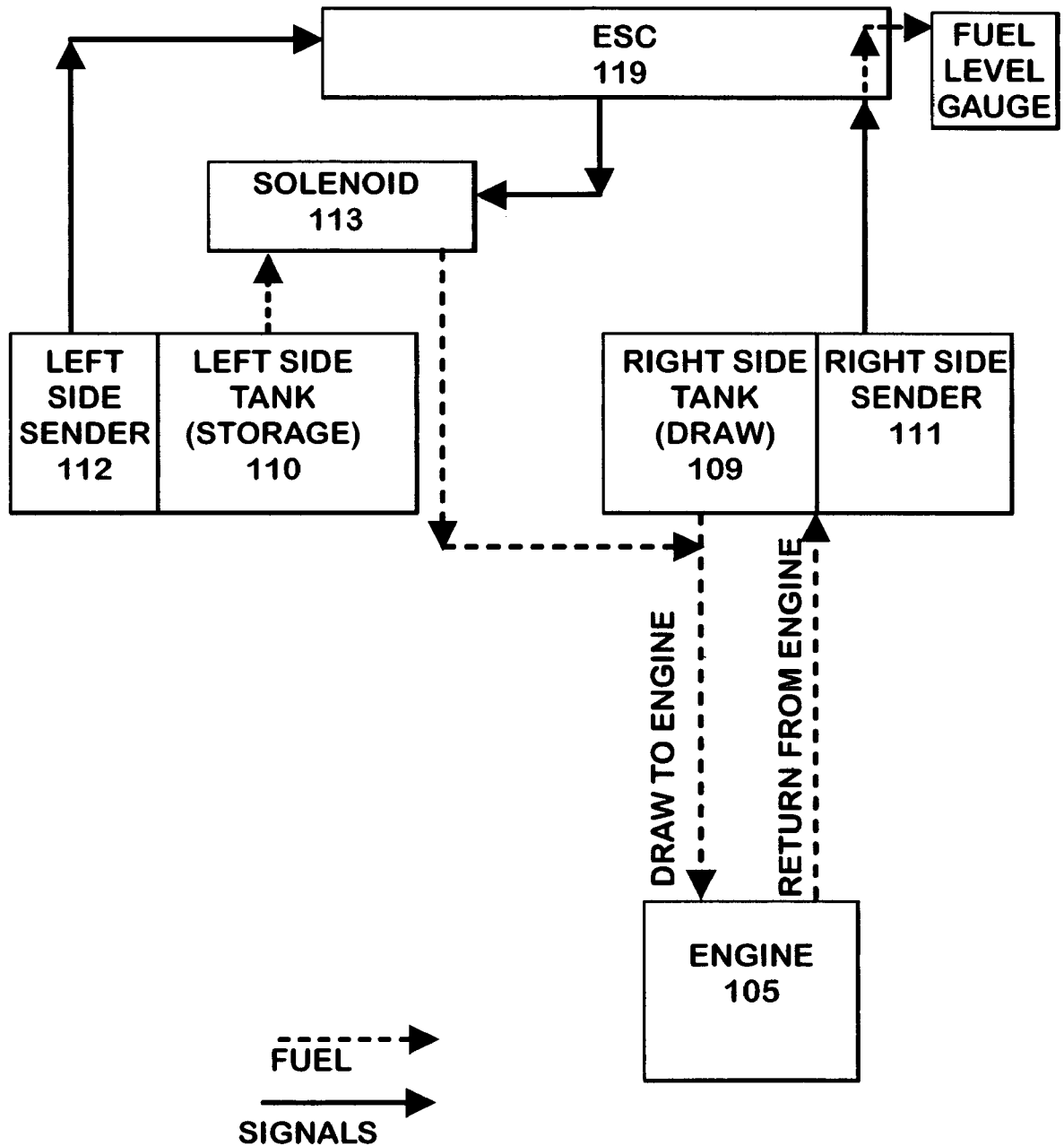
FIG. 2 is a block diagram of the system of the chassis of FIG. 1 without the rest of the chassis.

A vehicle 101 with an engine 105 may have a chassis 102 comprised of left and right frame members 103 and 104. Such a vehicle is shown in FIG. 1. The vehicle 101 may contain a cross frame structure member 106 between the frame members 103 and 104. The chassis 102 contains axles with wheels 108. The engine 105 may be engaged to the cross frame member 106. The engine 105 consumes fuel from two fuel tanks, 109 and 110 shown as right and left fuel tanks 109 and 110, shown engaged to the frame members 103 and 104. This document also refers to these two tanks as primary and secondary or first and second as the case may be. The physical location of the tanks 109 and 110 is not important to this invention, just that there are at least two tanks 109 and 110 engaged to the vehicle 101. The left fuel tank 110 contains a fuel level sender or detector 112. The right fuel tank 109 contains a fuel level sender or detector 111. There is a fuel supply or draw line 114 engaged to the left fuel tank 110. The left fuel tank draw or supply line 114 that contains a control valve 113. The control valve 113 dumps into a right tank draw line 115. The fuel supply or draw line 115 is engaged to right fuel tank 109 and transitions into common supply line 116 that leads to the engine 105. There is a fuel return line 121 from the engine 105 that leads to primary or right tank 109. The control valve 113 when closed makes the system a single tank draw, single tank return system. When the control valve is open, the system is a dual draw, single return valve system in that both primary tank 109 and secondary tank 110 are being drawn upon by the engine 105. The control valve 113 may be electronic, solenoid, hydraulic, or air operated so long as there are intakes from each tank and a common line going to the engine 105. An electronic controller 119 of the vehicle controls the control valve 113.

The electronic controller 119 contains a processor unit that is electrically engaged to receive tank level indications from both of the fuel level sender or detectors 111 and 112. The electronic controller 119 may be programmed to control the control valve 113 to shift the system to dual draw, single return when the primary tank 109 falls a pre-specified level below secondary tank 110. As the secondary tank level drops to approximately equalize with the primary tank 109, the electronic controller 119 is programmed to close the control valve 113 and shift the system to single draw, single return. The controller 119 takes the inputs from the fuel senders 111 and 112, and compares levels between the tanks 109 and 110. Upon the level in the primary tank 109 falling to a pre-specified amount or differential volume, Delta V below the level in the secondary tank 110, the electronic controller 119 opens the control valve 113 to draw from the secondary tank. The pre-specified amount Delta V may be an amount large enough to allow for inaccuracies in the fuel level senders but small enough to keep the tank levels close. As the level in the secondary tank falls to approximately the level in the primary tank, the electronic controller closes the control valve 113 draw only from the primary tank 109. This process is repeated with the result being balanced levels between the tanks without the need to siphon or pump from one tank to the other. In one embodiment the Delta V is 10 to 20% of tank volume.

As described above, the vehicle and associated fuel delivery system and components of this invention provide a number of advantages, some of which have been described above and others of which are inherent in the invention. Also modifications may be proposed to the vehicle and associated fuel delivery system and components of this invention without departing from the teachings herein.

We claim:

1. A mobile vehicle, comprising:
   a chassis comprised of frame members with an engine engaged for driving the vehicle;
   at least two fuel tanks, a primary tank and a secondary tank, engaged to said chassis frame members;
   each said fuel tank have a fuel level sender;
   said fuel level senders electrically engaged to a vehicle electronic controller to provide fuel tank level indication to said electronic controller;
   a return line from said engine engaged to said primary tank;
   a draw line from said primary tank engaged to said engine;
   a draw line from said secondary tank engaged to an inlet to a control valve and an outlet of said control valve engaged to said draw line from said primary tank between said primary tank and said engine;
   said electronic controller programmed to control said control valve such that closing said control valve isolates said secondary tank and allows said engine to draw from only said primary tank;
   said electronic controller programmed to control said control valve such that opening said control valve enables said engine to draw from both said primary tank and said secondary tank; and
   said electronic controller programmed to open and close said control valve based upon differential volume between said primary and said secondary tanks as determined by indications provided to said electronic controller from said fuel level senders in said primary and said secondary tanks.

2. The vehicle of claim 1, wherein:
   said electronic controller programmed to open said control valve to enabling said engine to draw from both said primary tank and said secondary tank when said primary tank is a pre-specified differential volume below level in said secondary tank; and
   said electronic controller programmed to close said control valve to enabling said engine to draw from only said primary tank when said primary tank level is approximately that of said secondary tank.

3. The vehicle of claim 2, wherein said differential volume is between ten and twenty percent of total tank volume.

4. The vehicle of claim 2, wherein said control valve is a solenoid valve.

5. The vehicle of claim 2, wherein said control valve is an electronic valve.

6. The vehicle of claim 2, wherein said control valve is a hydraulic valve.

7. The vehicle of claim 2, wherein said control valve is an air operated valve.

8. A fuel distribution system for a mobile vehicle, with a chassis with frame members comprising:
   at least two fuel tanks, a primary tank and a secondary tank, for engagement to the mobile vehicle chassis frame members;
   each said fuel tank have a fuel level sender;
   said fuel level senders electrically engaged to an electronic controller to provide fuel tank level indication to said electronic controller;
   a return line from an engine engaged to said primary tank;
   a draw line from said primary tank engaged to said engine;
   a draw line from said secondary tank engaged to an inlet to a control valve and an outlet of said control valve engaged to said draw line from said primary tank between said primary tank and said engine;
   said electronic controller programmed to control said control valve such that closing said control valve isolates said secondary tank and allows said engine to draw from only said primary tank;
   said electronic controller programmed to control said control valve such that opening said control valve enables said engine to draw from both said primary tank and said secondary tank; and
   said electronic controller programmed to open and close said control valve based upon differential volume between said primary and said secondary tanks as determined by indications provided to said electronic controller from said fuel senders in said primary and said secondary tanks.

9. The fuel distribution system of claim 8, wherein:
   said electronic controller programmed to open said control valve to enabling said engine to draw from both said primary tank and said secondary tank when said primary tank is a pre-specified differential volume below level in said secondary tank; and
   said electronic controller programmed to close said control valve to enabling said engine to draw from only said primary tank when said primary tank level is approximately that of said secondary tank.

10. The fuel distribution system of claim 9, wherein said differential volume is between ten and twenty percent of total tank volume.

11. The fuel distribution system of claim 9, wherein said control valve is a solenoid valve.

12. The fuel distribution system of claim 9, wherein said control valve is an electronic valve.

13. The fuel distribution system of claim 9, wherein said control valve is a hydraulic valve.

14. The fuel distribution system of claim 9, wherein said control valve is an air operated valve.

* * * * *